United States Patent
Richman et al.

(10) Patent No.: US 10,540,489 B2
(45) Date of Patent: Jan. 21, 2020

(54) AUTHENTICATION USING MULTIPLE IMAGES OF USER FROM DIFFERENT ANGLES

(71) Applicant: Sony Corporation, Tokyo (JP)

(72) Inventors: Steven Richman, San Diego, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 15/653,783

(22) Filed: Jul. 19, 2017

(65) Prior Publication Data

US 2019/0026449 A1    Jan. 24, 2019

(51) Int. Cl.
*H04L 29/06*  (2006.01)
*G06F 21/32*  (2013.01)
*G06T 7/00*   (2017.01)
*G06K 9/00*   (2006.01)
*G06K 9/22*   (2006.01)

(52) U.S. Cl.
CPC ......... *G06F 21/32* (2013.01); *G06K 9/00288* (2013.01); *G06T 7/97* (2017.01); *G06K 9/00255* (2013.01); *G06K 9/00275* (2013.01); *G06K 9/22* (2013.01); *G06T 2207/30201* (2013.01)

(58) Field of Classification Search
CPC .................................................... G06F 21/32
See application file for complete search history.

(56) References Cited

U.S. PATENT DOCUMENTS

| | | | |
|---|---|---|---|
| 8,396,265 B1 * | 3/2013 | Ross | G06K 9/00214 382/103 |
| 8,542,879 B1 | 9/2013 | Nechyba et al. | |
| 8,856,541 B1 * | 10/2014 | Chaudhury | G06F 21/32 382/115 |
| 8,966,613 B2 * | 2/2015 | Horvitz | G06F 21/32 726/17 |
| 9,087,233 B2 | 7/2015 | Heringslack | |
| 9,230,158 B1 | 1/2016 | Ramaswamy | |
| 9,539,500 B2 | 1/2017 | Leyvand et al. | |
| 2003/0123714 A1 * | 7/2003 | O'Gorman | G06K 9/00026 382/124 |

(Continued)

FOREIGN PATENT DOCUMENTS

| | | | |
|---|---|---|---|
| EP | 2993619 A1 | 3/2016 | |
| JP | 2007011456 A * | 1/2007 | |
| JP | 5317210 B2 * | 10/2013 | |

OTHER PUBLICATIONS

Findling, Rainhard D., Mayrhofer, Rene, "Towards Secure Personal Device Unlock Using Stereo Camera Pan Shots", Department for Mobile Computing, Upper Austria University of Applied Sciences, Feb. 2013, Hagenberg, Austra.

(Continued)

*Primary Examiner* — Shawnchoy Rahman
(74) *Attorney, Agent, or Firm* — John L. Rogitz (57) ABSTRACT

A sequence of photographs is taken of the face (and if desired the upper body) of a user of a mobile device using the camera of the mobile device. Each photo is taken at a different angle from the user. The sequence is compared with a stored sequence and if a match is found, access to the device is granted. The user typically holds the device with arms extended outward and moves the device 180° across his face to take the sequence for authentication purposes.

17 Claims, 4 Drawing Sheets

(56) References Cited

U.S. PATENT DOCUMENTS

| | | | |
|---|---|---|---|
| 2008/0010079 A1* | 1/2008 | Genda | H04N 1/00326 |
| | | | 358/1.15 |
| 2009/0016574 A1* | 1/2009 | Tsukahara | A61B 5/117 |
| | | | 382/117 |
| 2011/0103643 A1* | 5/2011 | Salsman | G06K 9/00261 |
| | | | 382/103 |
| 2011/0239117 A1* | 9/2011 | Sutton | G06F 3/0486 |
| | | | 715/706 |
| 2012/0011575 A1* | 1/2012 | Cheswick | G01S 19/14 |
| | | | 726/5 |
| 2013/0036462 A1* | 2/2013 | Krishnamurthi | G06F 21/32 |
| | | | 726/19 |
| 2013/0182128 A1* | 7/2013 | Amtrup | H04N 1/3878 |
| | | | 348/207.1 |
| 2013/0286161 A1 | 10/2013 | Lv et al. | |
| 2013/0326613 A1* | 12/2013 | Kochanski | G06F 21/32 |
| | | | 726/19 |
| 2014/0173031 A1* | 6/2014 | Ueda | H04L 67/02 |
| | | | 709/217 |
| 2014/0253791 A1* | 9/2014 | Koskinen | H04N 5/232 |
| | | | 348/362 |
| 2015/0334567 A1 | 11/2015 | Chen et al. | |
| 2016/0007007 A1 | 1/2016 | Nevet et al. | |
| 2016/0080639 A1* | 3/2016 | Choi | H04N 5/23232 |
| | | | 348/222.1 |
| 2016/0335511 A1* | 11/2016 | MacDonald | G06K 9/00335 |
| 2017/0124385 A1* | 5/2017 | Ganong | G06K 9/00677 |
| 2017/0256051 A1* | 9/2017 | Dwivedi | G06T 7/11 |
| 2017/0339137 A1* | 11/2017 | Vanoni | H04N 5/33 |
| 2018/0024074 A1* | 1/2018 | Ranieri | G01J 3/10 |
| | | | 382/143 |
| 2018/0211097 A1* | 7/2018 | Wang | G06K 9/00255 |
| 2019/0026449 A1* | 1/2019 | Richman | G06T 7/97 |

OTHER PUBLICATIONS

Rainhard D. Findling, Rene Mayrhofer, "Towards Face Unlock: On the Difficulty of Reliably Detecting Faces on Mobile Phones", Department for Mobile Computing, Upper Austria University of Applied Sciences, 2012, Hagenberg, Austria.

Zoran Biuk, Sven Loncaric, "Face Recognition from Multi-Pose Image Sequence", Faculty of Electrical Engineering and Computing, University of Zagreb, 2001, Croatia.

* cited by examiner

AUTHENTICATION USING MULTIPLE IMAGES OF USER FROM DIFFERENT ANGLES

FIELD

The present application relates to technically inventive, non-routine solutions that are necessarily rooted in computer technology and that produce concrete technical improvements.

BACKGROUND

Mobile communication devices such as wireless telephones and tablet computers use fingerprinting to assure security by requiring a fingerprint match to allow access to the device functions. A person's fingerprint is taken by swiping the primary finger over a fingerprint scanner.

As understood herein, such devices also include relatively high pixel-based cameras that can achieve a higher level of detail in camera images. Indeed, cameras on mobile device now take images of several million pixels.

SUMMARY

Present principles recognize the above and so provide authentication for accessing a mobile device using identity verification by testing multiple images taken by the camera of the device of a person from multiple different angles. The high accuracy of the technique renders it suitable for accessing banking and other personal ID dependent information.

A mobile device includes at least one camera, at least one processor, and at least one storage with instructions executable by the processor to receive a first image of a user taken from a first angle relative to the user, and receive at least a second image of a user taken from a second angle relative to the user. The instructions are executable to, based at least in part on the first and second images matching comparison information, permit access to at least one function of the mobile device, but based at least in part on the first and second images not matching the comparison information, not permit access to the at least one function of the mobile device. The comparison information typically is two different mages of the user from two respective perspectives of the user, e.g., full face and profile.

In example embodiments, the first and second angles are relative to a direction in which the user faces. The instructions can be executable to present on the mobile device at least one user interface (UI) prompting the user to move the mobile device in front of the user. The UI can include informing the user to look in a specified direction. The UI also can inform the user to activate the camera.

In non-limiting implementations, the instructions are executable to automatically start the camera taking images responses to an authentication event. Example instructions may be executable to receive at least a third image of a user taken from a third angle relative to the user. In this example, the first angle can be directly in front of the user, the second angle is from the left of the user, and the third angle is from the right of the user. The instructions are executable to, based at least in part on the first, second, and third images matching the comparison information, permit access to the at least one function of the mobile device, and otherwise not permit access to the at least one function.

In another aspect, a method includes using at least one camera to take a series of photographs of a user's face with respective different angles of incidence to the camera. The method includes comparing the series if photographs to reference images, and responsive to at least a threshold number of the images matching respective reference images, authenticating the user. On the other hand, responsive to at least a threshold number of the images not matching respective reference images, the method includes not authenticating the user. The threshold number of images is greater than one.

In another aspect, a device includes at least one computer storage that is not a transitory signal and that in turn includes instructions executable by at least one processor to take plural images of a person's face using a computing device having at least one camera as the computing device pans across the user's face. The instructions are executable to compare the plural images to reference images, and based at least in part on results of the comparison, determine whether to authenticate the user.

The details of the present disclosure, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
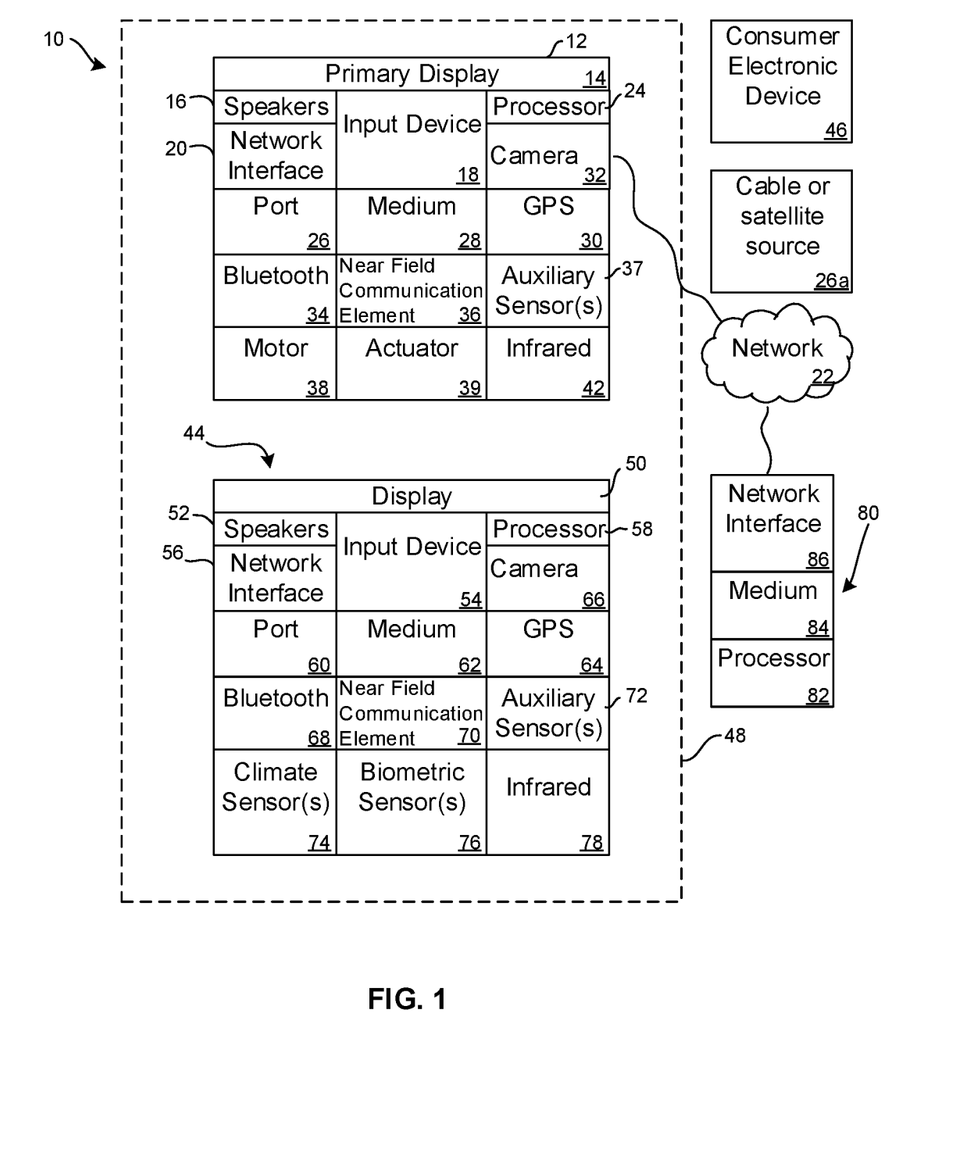
FIG. 1 is a block diagram of an example system including an example in consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44. The second CE device 46 may be implemented by a mobile communication device or other mobile computing device such as a wireless telephone or tablet computer.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
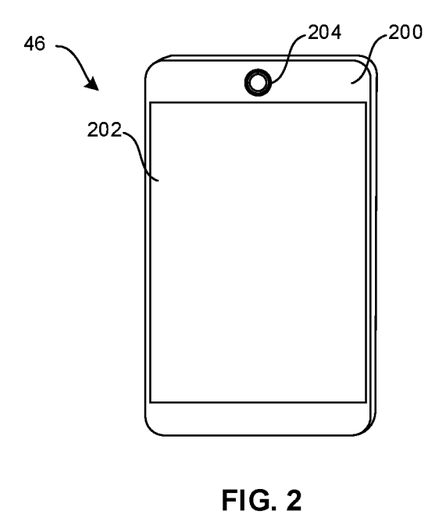
FIG. 2 is a perspective view and FIG. 3 is a side view of an example mobile device implemented by a wireless telephone.
Figure 3:
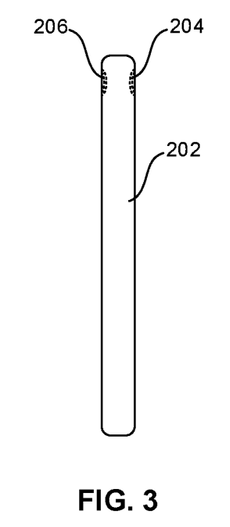

Now referring to FIGS. 2 and 3, the CE device 46 of FIG. 1 may be embodied by a computing device 200 such as a tablet computer or smart phone. In the example shown, the computing device 200 includes a touch screen display 202 that substantially spans the entire front surface of the device, and front- and rear-facing cameras 204, 206.

Figure 4:
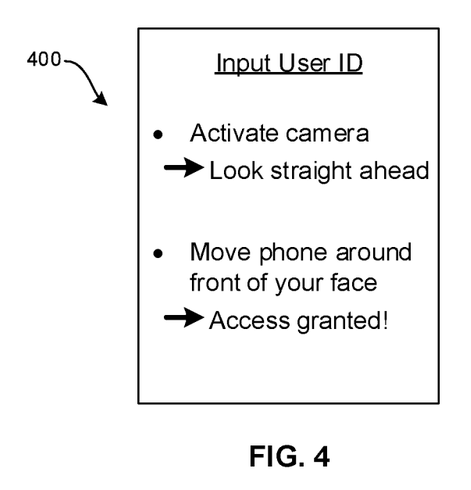
FIG. 4 is a screen shot of an example authentication user interface (UI) that can be presented on the device.

With this basic example architecture in mind, FIG. 4 illustrates that a user interface (UI) 400 may be presented on the display 202 for purposes of authentication. The UI may additionally or alternatively be audibly presented on one or more speakers of the computing device.

As shown, in response to an authentication event as discussed further below, the UI prompts the user to input his or her user identification, and then to activate the camera function of the device. The UI can prompt the user to initially look straight ahead with the camera held at arm's length in front of the user's face, to produce a full-face image. The UI can then prompt the user to move the mobile device in front of the user in, e.g., a one hundred eighty-degree arc, with the camera activated.

Figure 5:
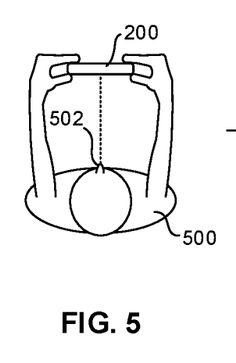
FIGS. 5-10 are schematic diagrams illustrating a user of the mobile device moving the device in an arc in front of the user's face to take multiple images of the user from different angles.
Figure 6:
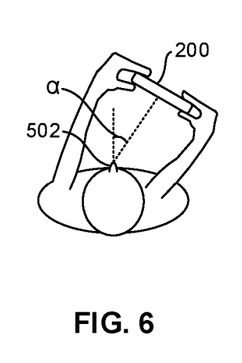
Figure 7:
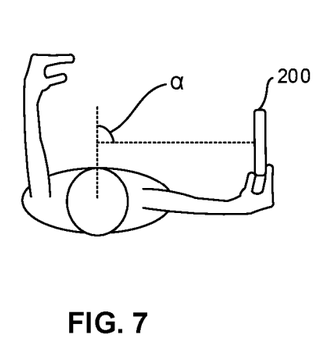

FIGS. 5-10 illustrate. In FIG. 5, the user 500 holds the device 200 directly in front of his face, looking straight ahead at the device as indicated by the direction in which the nose 502 is pointed. In FIGS. 6 and 7, the user moves the camera in an arc to the right, at arm's length in some examples or closer than arm's length in other examples, until the device is substantially revolved ninety degrees (90°) to the right relative to the user as shown in FIG. 7, i.e., with the plane of the display 202 of the device being parallel to the direction in which the user's head is pointed. Note that the user preferably keeps looking straight ahead as he or she moves the camera right. Thus, an image of the user taken by the device when in the orientation of FIG. 7 is a right-side profile image. On the other hand, an image of the user taken while the device is in the orientation of FIG. 6 is at an angle α that is between zero degrees (0°) and ninety degrees (90°). The angle α is the angle established between the direction along which the camera's field of view is centered (typically perpendicular to the plane of the display 202) and the direction in which the user's head is pointed. The angle α is acute in FIGS. 6 and 9 and is approximately ninety degrees in FIGS. 7 and 10 (depending on the user's accuracy in holding the camera precisely at the correct location).

Figure 8:
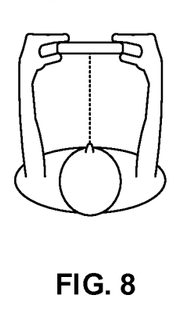
Figure 9:
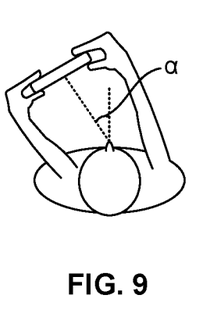
Figure 10:
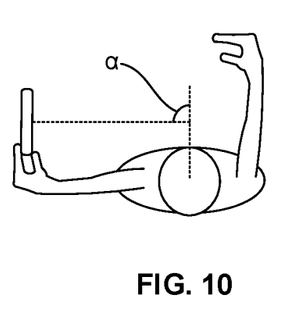

FIGS. 8-10 show that the user then moves the camera in an arc back to the left, from the far-right orientation of FIG. 7, back through the full-frontal face location in FIG. 8, and through the intermediate left location of FIG. 9 (essentially at a negative angle α from the location of FIG. 6) to a full left position in FIG. 10, in which the camera's line of sight is directly at the left ear of the user. It will be readily appreciated that the device locations and hence camera field of view as between FIGS. 7 and 10 are mirror images of each other.

Figure 11:
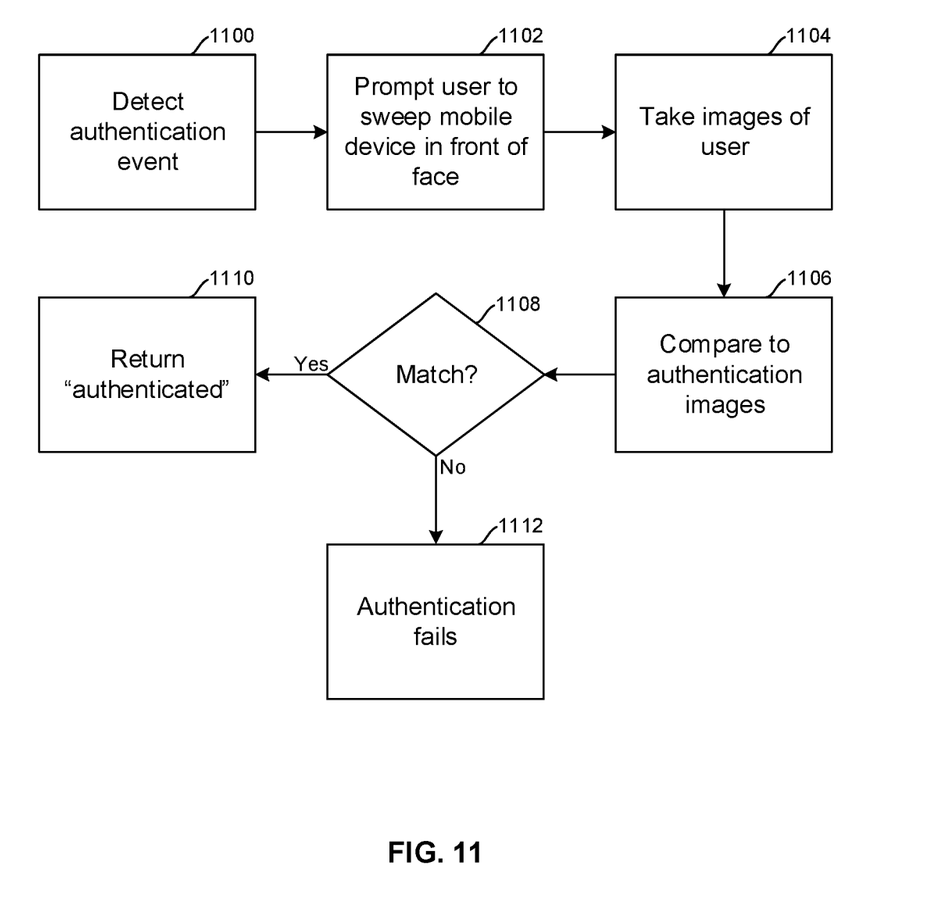
FIG. 11 is a flow chart of example logic consistent with present principles.

FIG. 11 illustrates example logic that may be executed by the processor of the device 200 or by a server or other computing device in communication therewith with the understanding afforded by FIGS. 5-10 in mind. At block 1100, one or both of the cameras 204, 206 of the computing device 200 may be activated to begin continuously or near-continuously taking images in response to an authentication event. Without limitation, the authentication event may be an initial baseline imaging triggered by interaction with an authentication user interface to establish reference images of the user. Such an event may be done under secure circumstances, such as at the point of sale of the device, or by first inputting a secondary biometric signal such as a fingerprint, voice print, password, pass code, encryption key, or other means to ensure security of the initial baseline imaging step. The user is prompted by the UI 400 in FIG. 4 to move the camera as illustrated in FIGS. 5-10 to take the reference images as the camera pans in front of the user.

Subsequently, another authentication event may occur to initiate authentication of the user. Such an event may be, without limitation, subsequent power-on of the device, subsequent power-up of the device from a sleep state, elapse of a period of time, initiation of one or more predetermined applications such as banking applications, etc.

In response to the authentication event, the camera(s) of the device may be automatically activated to start imaging, and at block 1102 the UI of FIG. 4 or other prompt may be used to prompt the user to pan the device as shown in FIGS. 5-10, preferably while looking straight ahead without turning his or her head as the camera pans. As the camera pans, images of the user are taken at block 1104.

Moving to block 1106, the images, as soon as they are taken, may be compared to the reference images taken at the initial baseline imaging process described above. It will be appreciated that at least two and preferably more than two images of the user are taken and compared to reference images, with one of the images being compared taken from the front of the user looking directly at the user's face, at least one image taken from the right of the user, and at least one image taken from the left of the user.

Proceeding to decision diamond 1108, it is determined, based at leak in part on some of the images taken at block 1104, whether one or more images match comparison information, such as the reference images. If so, authentication is returned at block 1110 to unlock at least one function of the mobile device, and otherwise access to the at least one function is not permitted at block 1112, at which "authentication fails" essentially is returned.

By taking a series or a sequence of photographs of a mobile user's face and upper body with different angles of incidence to the lens, one can determine with a high degree of certainty if the person in front of the camera is the owner of the mobile device. Comparing the current photo series taken in real time with a stored photo series profile that serves as the reference, the security of the device and applications running on it are supported. The mobile device holder positions the camera lens with arms extended outward and proceeds to move the mobile device camera 180 degrees across the person's face. The user can employ the front or rear facing camera lens and pans it from one side of the person's face to the opposite side. The camera takes multiple shots as it pans across the front viewpoint of the holder while facing forward so as to get side angles. The panning technique creates a volumetric image that can then be compared to a known secure and locked standard set of sequential images. Volumetric 3D imaging and mapping of the face allows for multiple angles of incidence to be used as to form a full 3D image with a unique number of data points set for assessing originality. This application takes advantage of the parallax or displacement or difference in the apparent position of an object viewed along multiple lines of sight. The additional depth cues and information form the basis for a 3D picture that is exceptionally, if not impossible, to reproduce live.

While particular techniques are herein shown and described in detail, it is to be understood that the subject matter which is encompassed by the present application is limited only by the claims.

What is claimed is:

1. A mobile device comprising:
   at least one camera;
   at least one processor; and
   at least one storage with instructions executable by the processor to:
   cause the camera to generate a series of photographs;
   compare the series of photographs to reference images;
   responsive to at least a threshold number of images in the series of photographs matching respective reference images, authenticate a user; and
   responsive to at least a threshold number of images in the series of photographs not matching respective reference images, not authenticate the user, the threshold number of images being greater than one, wherein "N" images are taken, and the threshold number of images is less than "N".

2. The mobile device of claim 1, wherein the instructions are executable to:
   receive a first image in the series taken from a first angle relative to the user;
   receive a second image of a user taken from a second angle relative to the user, wherein the first and second angles are relative to a direction in which the user faces.

3. The mobile device of claim 1, wherein the instructions are executable to:
   present on the mobile device at least one user interface (UI) prompting the user to move the mobile device in front of the user.

4. The mobile device of claim 3, wherein the UI includes informing the user to look in a specified direction.

5. The mobile device of claim 3, wherein the UI informs the user to activate the camera.

6. The mobile device of claim 2, wherein the instructions are executable to:
   receive at least a third image of a user taken from a third angle relative to the user, wherein the first angle is taken at an angle directly in front of the user, the second angle is from the left of the user, and the third angle is from the right of the user;
   based at least in part on the first, second, and third images matching comparison information, permit access to the at least one function of the mobile device, and otherwise not permit access to the at least one function.

7. A method, comprising:
   using at least one camera, taking a series of photographs of a user's face with respective different angles of incidence to the camera;
   comparing the series of photographs to reference images;
   responsive to at least a threshold number of images in the series of photographs matching respective reference images, authenticating the user; and
   responsive to at least a threshold number of images in the series of photographs not matching respective reference images, not authenticating the user, the threshold number of images being greater than one, wherein "N" images are taken, and the threshold number of images is less than "N".

8. The method of claim 7, wherein each angle of incidence is defined by an angle between a direction in which the user's head is pointed and an axis of a field of view of the camera.

9. The method of claim 8, wherein the different angles of incidence comprise a zero-degree angle, an acute angle $\alpha$, and an acute angle $-\alpha$.

10. A device comprising:
    at least one computer storage that is not a transitory signal and that comprises instructions executable by at least one processor to:
    present a prompt on a computing device to look in a single direction as the computing device pans;
    take plural images of a person's face using the computing device comprising at least one camera as the computing device pans across the user's face;
    compare the plural images to reference images; and
    based at least in part on results of the compare, determine whether to authenticate the user.

11. The device of claim 10, wherein the instructions are executable to:
    present a prompt on the computing device to pan the device in front of the person's face.

12. The device of claim 11, wherein the prompt is for the person to pan the computing device in front of the person's face.

13. The device of claim 10, wherein the instructions are executable to:
    based at least in part on at least a threshold number of the plural images matching respective reference images, permit access to at least one function of the computing device; and
    based at least in part on less than the threshold number of the plural images matching respective reference images, not permit access to the at least one function of the computing device.

14. The device of claim 10, wherein the instructions are executable to inform a user to activate the at least one camera.

15. The device of claim 10, wherein the instructions are executable to automatically start the at least one camera taking images responses to an authentication event.

16. The mobile device of claim 1, wherein the authentication event comprises power-on of the mobile device.

17. The mobile device of claim 1, wherein the authentication event comprises power-up of the mobile device from a sleep state.

* * * * *